INVENTOR
J. LINKE

BY Wenderoth, Lind + Ponack
Attys.

MAGAZINE ROCKET PROJECTORS

Filed Dec. 26, 1956 9 Sheets-Sheet 2

INVENTOR
J. LINKE

BY Wenderoth, Lind & Ponack
Attys.

Oct. 13, 1959 J. LINKE 2,908,200

MAGAZINE ROCKET PROJECTORS

Filed Dec. 26, 1956 9 Sheets-Sheet 3

INVENTOR
J. LINKE

BY Wenderoth, Lind & Ponack
Attys.

INVENTOR
J. LINKE

BY Wenderoth, Lind & Ponack
Attys.

INVENTOR
J. LINKE

BY Wenderoth, Lind & Ponack
Attys.

INVENTOR
J. LINKE

BY Wenderoth, Lind & Ponack
Attys.

Oct. 13, 1959 J. LINKE 2,908,200

MAGAZINE ROCKET PROJECTORS

Filed Dec. 26, 1956 9 Sheets-Sheet 7

INVENTOR
J. LINKE

BY Wenderoth, Lind & Ponack
Attys.

INVENTOR
J. LINKE

BY Wenderoth, Lind & Ponack
Attys.

Oct. 13, 1959 J. LINKE 2,908,200

MAGAZINE ROCKET PROJECTORS

Filed Dec. 26, 1956 9 Sheets-Sheet 9

INVENTOR
J. LINKE

BY Wenderoth, Lind & Ponack
Attys.

2,908,200

MAGAZINE ROCKET PROJECTORS

Johannes Linke, Zurich, Switzerland, assignor to Machine Tool Works Oerlikon, Administration Company, Zurich-Oerlikon, Switzerland, a Swiss company Application December 26, 1956, Serial No. 630,590
Claims priority, application Switzerland January 1, 1956
4 Claims. (Cl. 89—1.7)

The invention relates to a rocket projector having a magazine containing the rockets and a feeder device which automatically conveys the rockets from the magazine into the firing position and ignites the same electrically.

Rocket projectors of this kind have, however, only a single firing barrel which is disadvantageous as regards the firing rate attainable since a rocket is switched into the firing position then only when the rocket projected previously has left the firing barrel, in order that its hot gas jet does not impinge on the subsequent one. This following-up requires a certain time interval the duration of which depends on the efficiency of the drive of the follow-up means and which in rocket projectors with a single firing barrel is adversely affected in that the rockets are made to follow up in jerks, i.e. that the same have to be accelerated from a state of rest and to be braked again at the end of the follow-up movement, which requires special provisions for the drive of the follow-up means.

The present invention has the main object of providing an automatic rocket projector in which the effect of the jerky follow-up of the rockets into the firing position, which has an adverse influence on the firing rate, is eliminated, and accordingly higher firing rates than hitherto can be attained.

With this and other objects in view, the rocket projector according to the invention comprises in combination: a rocket magazine, two firing barrels having each a loading chamber arranged side by side with parallel axes, a feeder device automatically conveying rockets from the said magazine into firing position alternately in one and the other of the said loading chambers, and electrical igniting means operatively connected to the said feeder device and to the said loading chambers and automatically igniting the rockets actually in firing position in the said loading chambers.

By this provision of two firing barrels the intervals between shots can be shortened, and accordingly the firing rate can be increased in that for example one rocket is ignited as soon as the rocket projected from the other barrel has left the same.

A further object of the present invention consists in supplying the rockets, when firing a series of shots, at a constant speed from the magazine and conveying the same at a uniform motion into the loading chambers, whereby the drive of the follow-up means can be simplified and dimensioned comparatively lightly.

Figure 1:
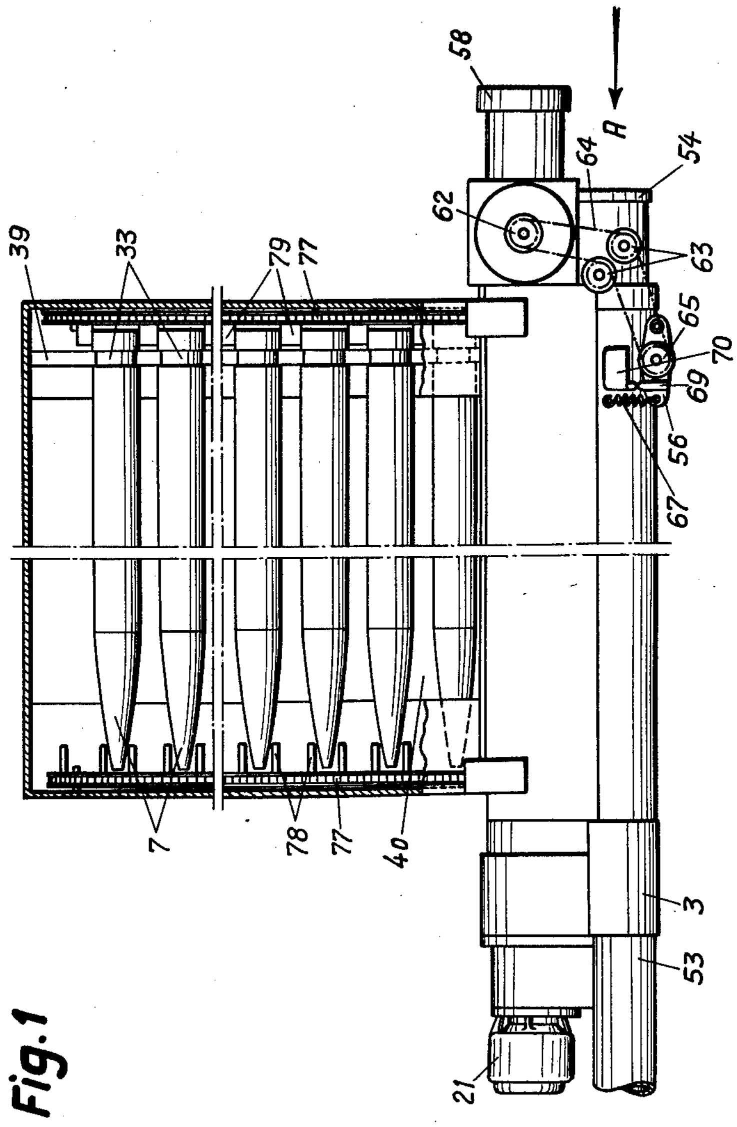
Figure 2:
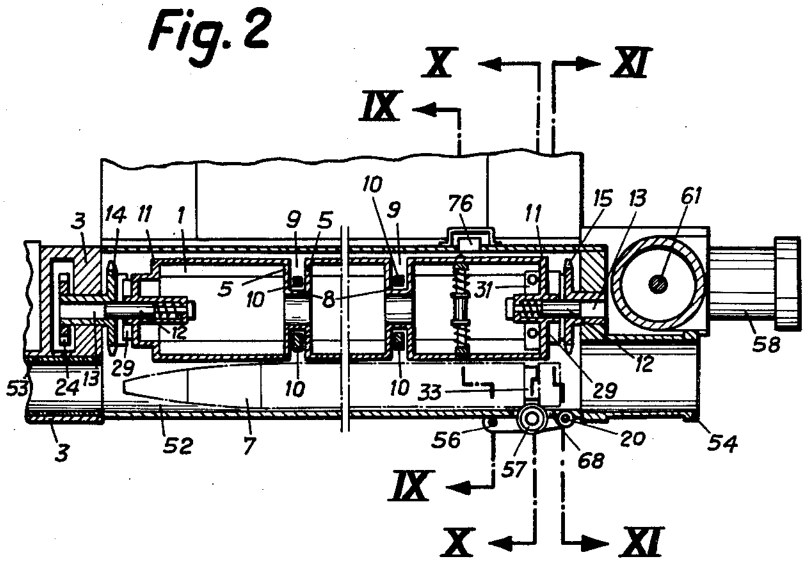
Figure 3:
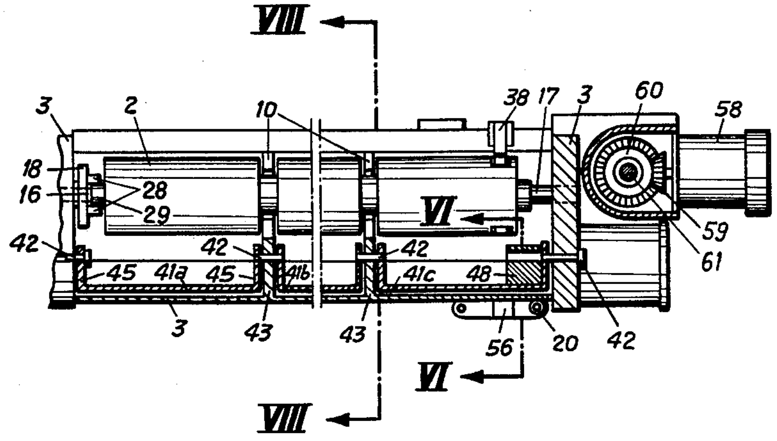
Figures 4, 6, 7:
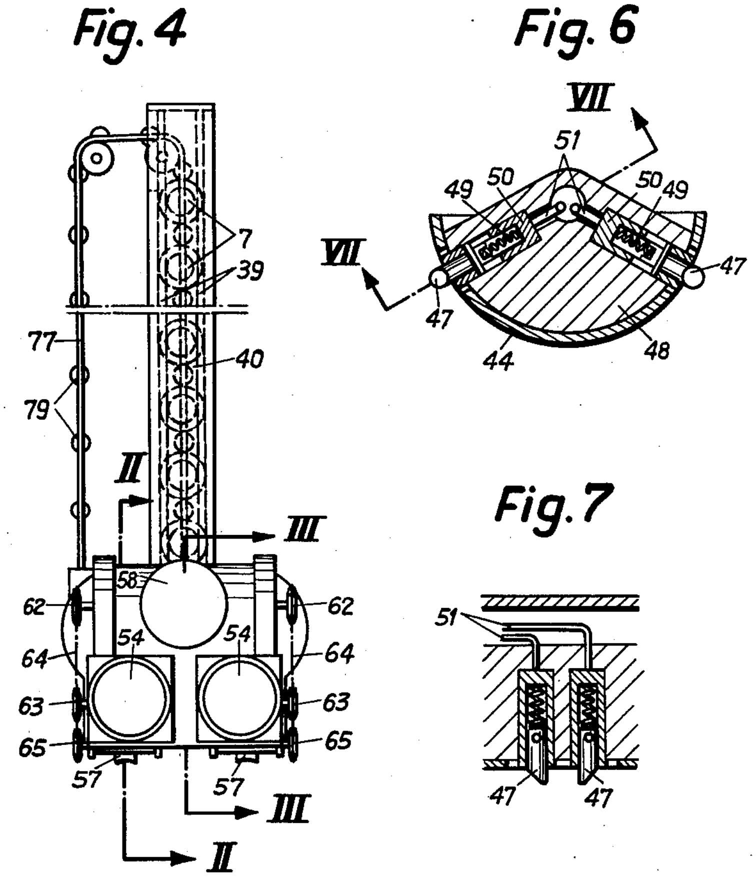
Figure 5:
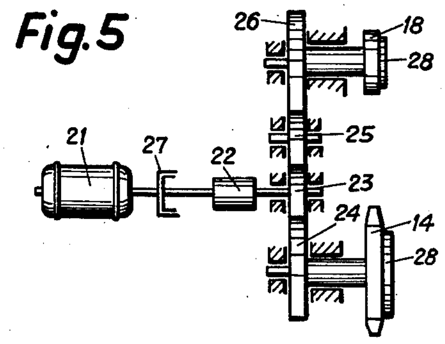
Figure 8:
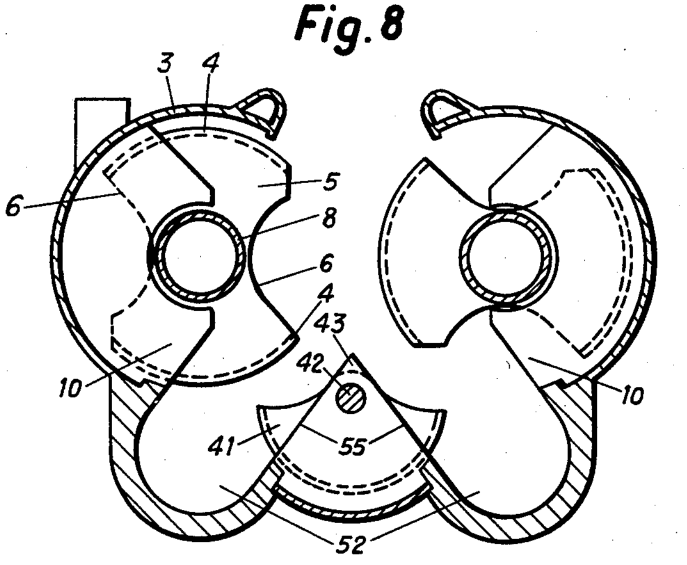
Figure 9:
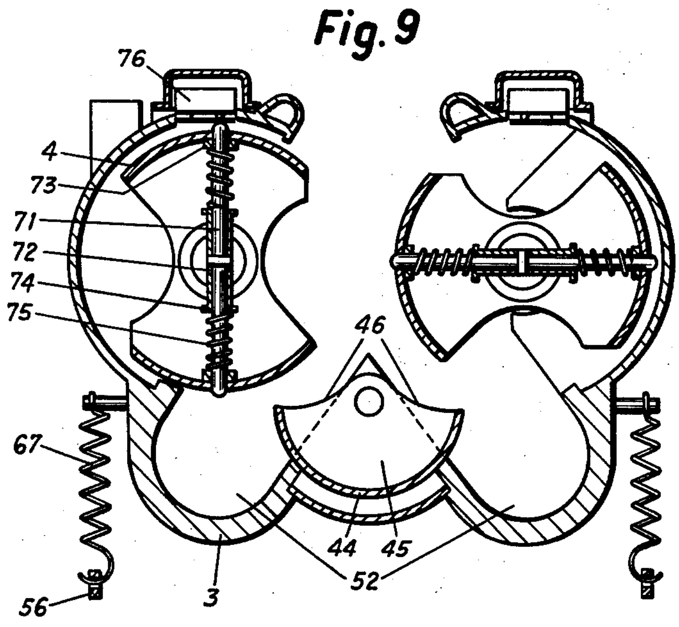
Figures 10, 11:
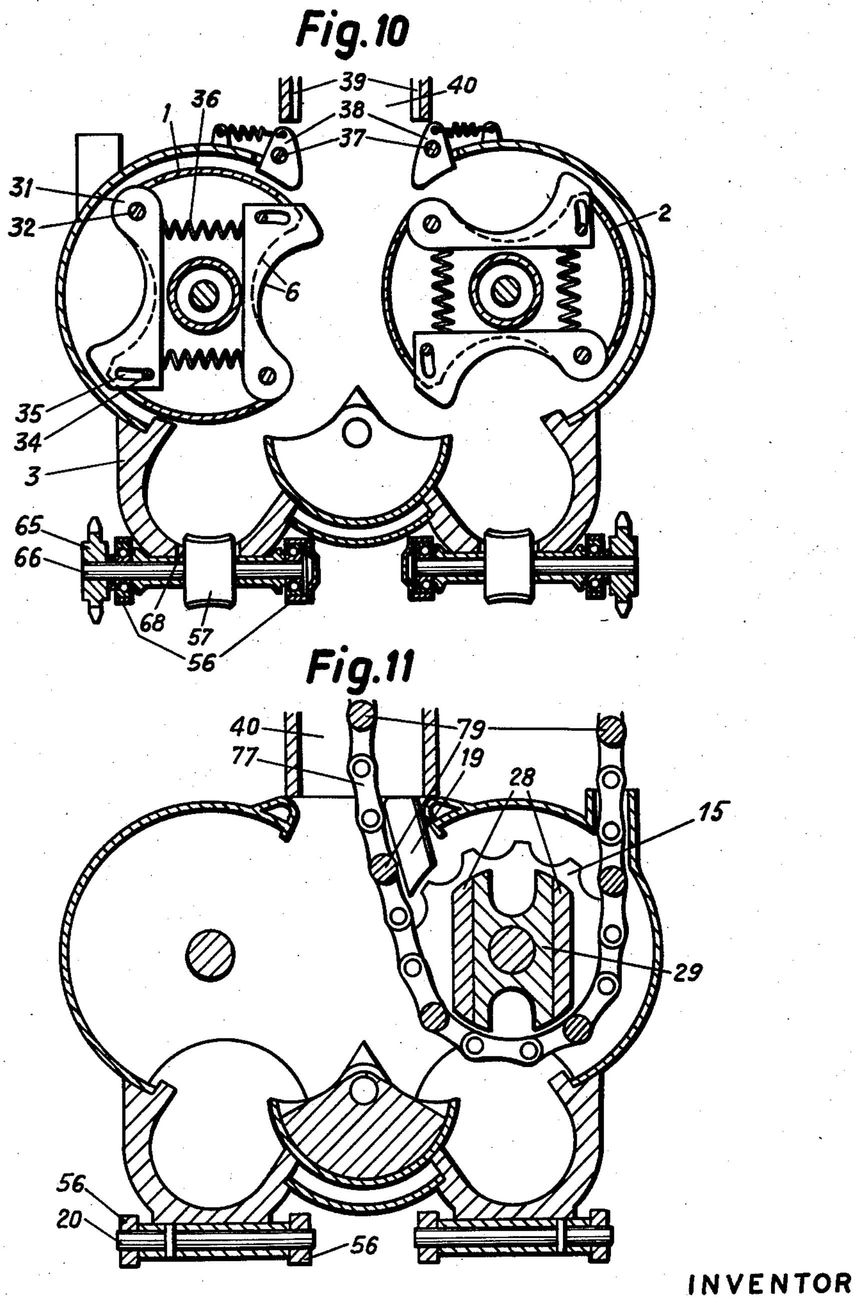
Figures 12, 13, 14, 15, 16:
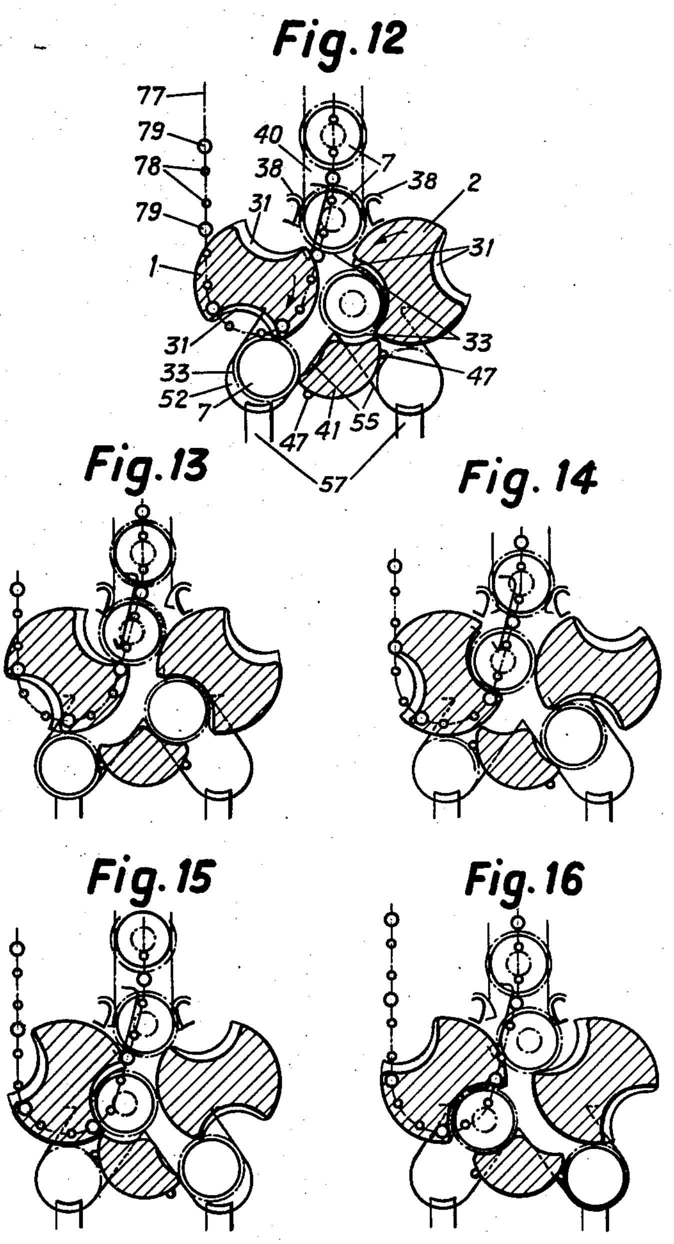
Figures 17, 18, 19:
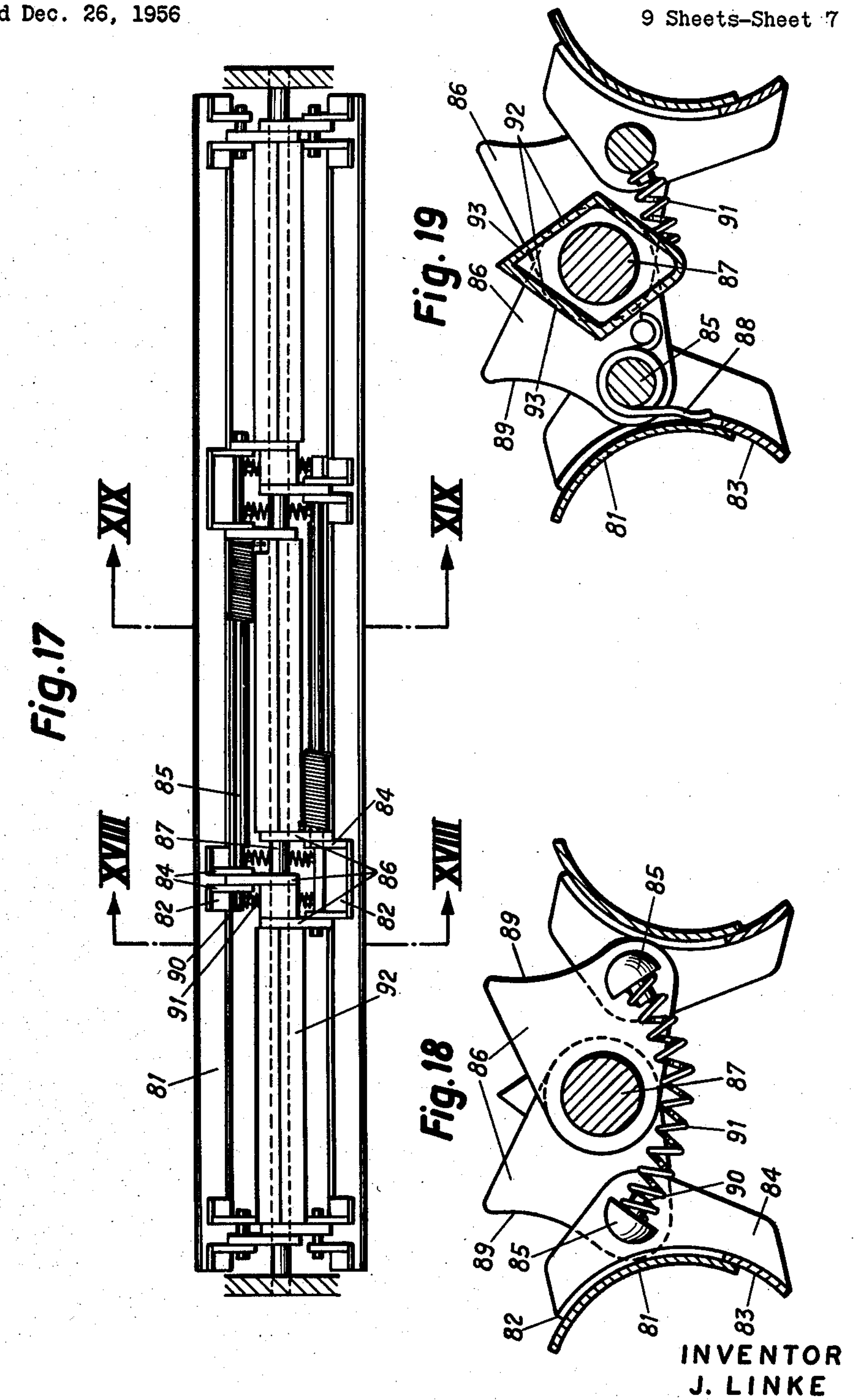
Figure 20:
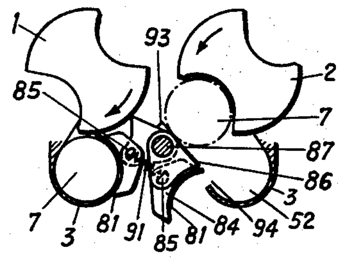
Figure 21:
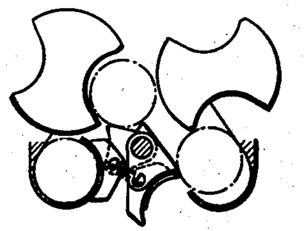
Figure 24:
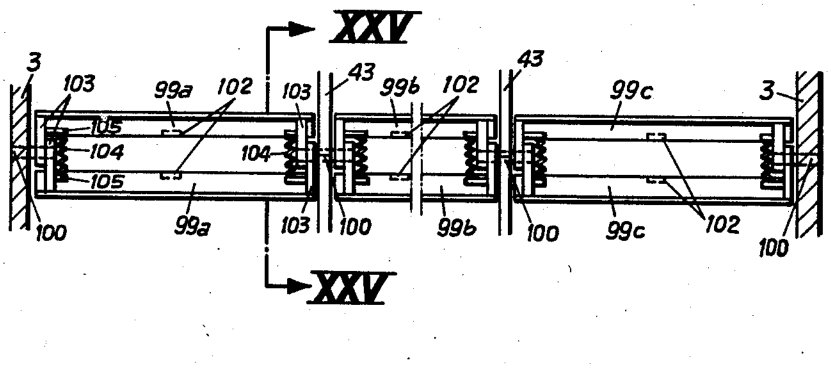
Figure 25:
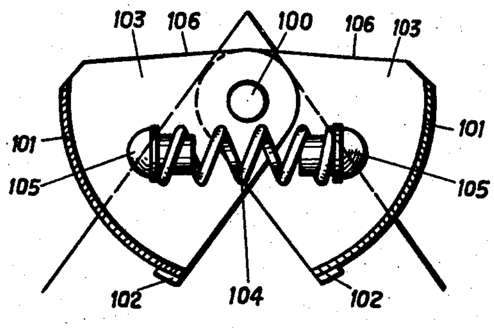

These and other objects and features of the present invention will be clearly understood from the following description of a preferred embodiment and of some modifications thereof given by way of example with reference to the accompanying drawings, in which:

Fig. 1 is a lateral part elevation of the rocket projector,

Fig. 2 is a longitudinal section of a control drum and loading chamber with rocket on the line II—II of Fig. 4, Fig. 3 is a longitudinal section along the centre plane of the rocket projector, on the line III—III of Fig. 4, Fig. 4 is a view in the direction A of Fig. 1, Fig. 5 is a diagrammatic representation of the drive of the control drums, Fig. 6 is a section of the contact pins on the line VI—VI of Fig. 3, Fig. 7 is a section of the contact pins on the line VII—VII of Fig. 6, Fig. 8 is a section on the line VIII—VIII of Fig. 3, Fig. 9 is a section on the line IX—IX of Fig. 2, Fig. 10 is a section on the line X—X in Fig. 2, Fig. 11 is a section on the line XI—XI of Fig. 2, Figs. 12–16 are diagrammatic representations of various phases of operation of the feeder- and control-mechanism for the rockets, with the first embodiment of the closure member for the loading chambers according to the Figs. 3 and 9, namely in Fig. 13 at the moment of the beginning of the ignition of a rocket in the left hand side loading chamber, Fig. 16 at the moment of the beginning of the ignition of a rocket in the right hand side loading chamber, Fig. 17 is a plan view of a second embodiment of the closure members for the loading chambers, Fig. 18 is a section on the line XVIII—XVIII of Fig. 17, Fig. 19 is a section on the line XIX—XIX of Fig. 17, Figs. 20–23 are diagrammatic representations of various phases of operation of the closure members for the loading chambers according to the second embodiment, Fig. 24 is a plan view of a third embodiment of the closure members for the loading chambers, Fig. 25 is a section on the line XXV—XXV of Fig. 24, Figs. 26–29 are diagrammatic representations of various phases of operation of the closure members for the loading chambers according to Figs. 24 and 25.

Fig. 1 shows the rocket projector in side elevation. The same consists of a casing 3 with the control drums 1, 2 (Figs. 2, 3) and the loading chambers 52 (Figs. 2, 9), and the projector barrels 53 which are merely indicated. The individual rockets 7 are supplied to the control drums 1, 2 mounted in the casing 3 by means of chains 77 in the magazine chute 40. These drums consist of individual sections each of which is composed of two tube segments 4 of equal size (Fig. 8). Their ends are held together by sheet metal walls 5 mounted perpendicularly on the segment walls and provided each with two symmetrically arranged circular recesses 6, the radii of which correspond to the radius of the rocket body 7. The sections are connected to one another by means of short tube sections 8 fixed perpendicularly on the sheet metal walls 5. Into the interstices 9 formed by the sheet metal walls 5 re-inforcement ribs 10 engage, which are attached to the wall of the casing and serve at the same time as slide tracks for the rockets. In the end walls 11 (Fig. 2) pins 12 are mounted co-axially to the longitudinal axes, which pins are longitudinally slidable and resiliently guided for the purpose of dismantling the control drums 1 and 2. These pins project from the end walls 11 and serve for mounting the control drum 1 in the bores 13 of the sprocket wheels 14 and 15 journalled in the casing 3. The control drum 2 (Fig. 3) is rotatably journalled by the pins 16 and 17 in bores of the driving gear 18 and of the casing 3. The motor 21 (Fig. 5) drives through a reduction gearing 22 a spur gear 23 which is mounted on the output shaft of the latter; this spur gear 23 drives directly the spur gear 24 keyed to the shaft of the sprocket wheel 14, and drives the drive gear 18 in the opposite sense through an intermediate gear 25 and a spur gear 26, said gear 18 being mounted on the shaft of said gear 26, and driving the control drum 2. Between the motor 21 and the reduction gearing 22 a magnetic clutch 27 is mounted. The sprocket wheel 14 (Fig. 2) is in driving connection with the control drum 1, the latter with the sprocket wheel 15, and the driving gear 18 (Fig. 3) with the control drum 2. For this purpose projecting parallel ledges 28 are arranged on the end faces of the gears 14, 15 and 18 which engage into projections 29 having milled parallel faces arranged on the outside of the end walls 11 of the two control drums 1 and 2 (Fig. 11). On each of the rear end faces 11 of the two control drums 1 and 2 two flaps 31 (Figs. 2, 10) having similar circular recesses 6 as the end walls 11 are rotatably mounted on axles 32. The width of the flaps corresponds to that of a circular groove 33 (Fig. 2) on the rocket body. Pins 34 (Fig. 10) fixed in the end walls 11 and projecting into slots 35 in the flaps 31 limit the rotational movement thereof about the axles 32. Springs 36 abutting the flaps 31 force the same back into their rest position after each deflection. Above the control drums 1 and 2 smaller spring loaded flaps 38 are mounted pivotally about axles 37 fixed to the casing, which flaps lie in the same plane and have the same width as the flaps 31 and guide ledges 39 in the magazine chute 40 (Fig. 10).

Between the control drums 1 and 2 underneath the longitudinal axes thereof the closure member of the loading chambers is arranged, which in the first embodiment is designed as a rocker 41 (Fig. 8) and is journalled rotatably in the casing 3 and in the ribs 43 of the casing by the axles 42 (Fig. 3). It consists of sections **41*a*, 41*b*, 41*c*, which are formed of tube segments 44 (Fig. 9) and are closed at their ends by walls fitted perpendicular to the tube wall 45, having the shape of circular sectors and having circular recesses 46 for the rockets. On the rear end wall of the rocker 41 two pairs of contact pins 47 (Figs. 6 and 7) for the electrical igniting of the rockets are fitted into a casing of insulating material, 48, in such a manner that they extend slightly beyond the outer face of the tube segment 44, but can be pushed into the contact sleeve 50 against the bias of the springs 49. The contact pins 47 are connected to the source of igniting current through the contact sleeves 50 and the cables 51** connected thereto.

Underneath and parallel to the axes of rotation of the control drums 1 and 2 the casing 3 is formed into two trough-shaped depressions of semi-circular cross section, which are the loading chambers 52 (Figs. 2, 9) designed for receiving the rockets prior to being fired. These chambers are continued in front by the projector barrels 53 which are inserted into the casing 3, and on the rear by the sockets 54 of the casing through which the combustion gases of the rocket can emerge.

At certain intervals from one another the ribs 43 of the casing (Figs. 3, 8) are arranged, the faces 55 of which are inclined towards the central axis of the rocket projector and run tangentially into the loading chambers, said faces serving as slide- and guide-tracks for the rockets.

From this assembly results the following manner of operation of the rocket feeder- and control-mechanism:

The endless chains 77 are driven by the sprocket wheels 14 and 15, guided over deflector wheels and along deflector sheets 19 arranged fixedly on the casing at the entry into the rocket projector, and guide the rockets, the ends of which are held between pins 78 and 79 fixed to the chain (Figs. 1, 12), from the magazine alternately into a recess 6 of one and the other control drum rotating in opposite directions at a speed depending on the rate of firing. The control drums 1 and 2 convey the rockets 7 along and control the same by means of the slide faces 55 (Fig. 12) consecutively and alternately into one and the other of the two loading chambers 52. A rocket 7 conveyed along these guide faces 55 into one of the loading chambers controls the igniting operation of the rocket already situated in a firing position in the other loading chamber, in that the rocker 41 is rocked against this rocket, whereby the two contact pins 47 come into touch with the igniter contact points of the rocket, and ignite the same.

In the loading chambers 52 the rockets are half encircled by the casing 3 and are guided along two further generatrices by the control drums 1 and 2 and the rocker 41 (Figs. 12–16). During the start of a rocket the rocker 41 and the control drum arranged above the loading chamber 52 concerned shut the same off forcibly in such a manner that the combustion gases can practically emerge only through the socket 54 of the casing.

The rockets are secured against being shifted in their longitudinal direction in the magazine chute 40 by ledges 39 (Figs. 4, 10), and subsequently on the path to the loading chambers always by at least one of the flaps 31 or 38 engaging into the annular groove 33 in the rocket body 7.

For the purpose of rearwardly ejecting duds (which have failed to ignite) rollers 57 are provided which are equipped with a friction lining and journalled in double levers 56 pivotally mounted about axles 20 fixed to the casing (Figs. 2, 11), said rollers being driven by a motor 58. The latter is in driving connection through a pair of bevel gears 59 and 60 (Fig. 3) with the shaft 61, and through the sprocket wheels 62 (Figs. 1, 4) mounted on the ends thereof in driving connection with the chain 64 guided over tensioning wheels 63, which chain drives the sprocket wheels 65 and thereby the rollers 57 fixed to the shafts 66 thereof (Fig. 10). Between the bevel gear 60 and the two sprocket wheels 62 magnetic clutches of conventional type are built into the shaft 61 (these clutches not being shown in the drawing). Springs 67 fixed to the ends of the double levers 56 (Figs. 1, 9) have the effect, that the rollers 57 are pressed across the apertures 68 in the casing 3 against the rockets located in the loading chambers 52, or in case these apertures are cleared by the rockets, project into the loading chambers 52 and, by turning the levers 56 about the axes 20, open the switch 70 fixed to the casing by means of cams 69 fixed thereon (Fig. 1). In the rear portion of the control drums 1 and 2 the switch pins 71 with sleeves 72 fixed thereon are so arranged (Fig. 9) that in the rest position they extend slightly beyond the surfaces of the tube segments 4. The sleeves slidably mounted in guides 73 welded to the tube segments 4, are held in a middle position by springs 75 abutting between the flanges 74 of the sleeve 72 and the guides 73. When the end of a switch pin 71 runs against a rocket in the course of rotation of the control drum which rocket is in a loading chamber 52, said pin is shifted in its longitudinal direction and accordingly closes with its other end the switch 76. The drive of the rollers 57, control drums 1 and 2 and chains 77 is controlled in the following manner:

When a rocket remains un-ignited in one of the loading chambers 52, the drive of the control drums and chains 77 is interrupted by the operation of the switch 76 disengaging the magnetic clutch 27 (Fig. 5); the motor 58 is started (Figs. 1, 3) and the magnetic clutch for the drive of the roller 57 associated with the loading chamber concerned is engaged. The rotary roller 57 is then pressed on the rocket by an additional thrust force applied to it by the driving chain 64, in addition to the force of the spring 67, and conveys the same rearwardly out of the loading chamber 52 and of the socket 54 of the casing. As soon as the tip of the rocket passes the roller 57, the same swings into the loading chamber 52, and thereby the motor 58 is switched off by operating the switch 70, the magnetic clutch for the drive of the rollers is disengaged, and the clutch 27 in the drive of the control drums 1 and 2 and of the chains 77 is engaged, so that the rocket projector is again ready for operation.

The switch pin 71 rotating with the control drum comes firstly into the position, in which it can be shifted by a rocket contained in the loading chamber, when the nozzle end of a normally ignited and started rocket is already in front of it. In the normal case the roller 57 is accordingly not driven.

Figure 22:
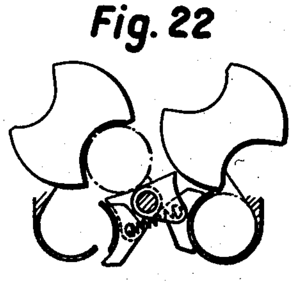
Figure 23:
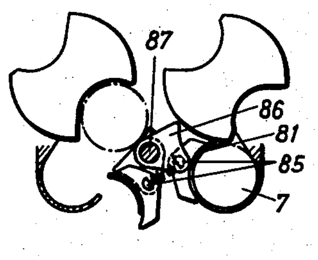
Figure 26:
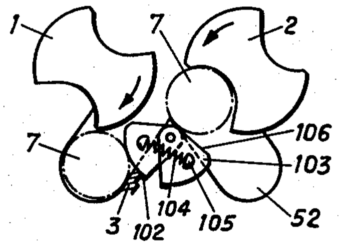
Figure 27:
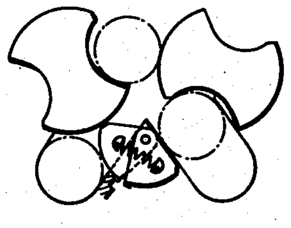
Figure 28:
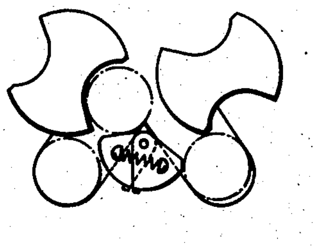
Figure 29:
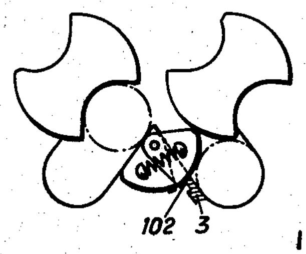

Figs. 17, 18 and 19 show a second embodiment of the closure members for the loading chambers in the form of flaps. The same are composed of the tube segments 81 (Figs. 17, 18) on which the smaller tube segments 83 provided at certain intervals with projections 82 are mounted in such a manner that they project beyond 81, and of the lugs 84 perpendicularly attached on 82 and 83 and articulated by the axles 85 to pawls 86 which are pivotally mounted on the axle 87 mounted in the casing 3. The torsion springs 88 pushed over the axles 85 and articulated to the pawls 86 apply a torque to the flaps which tends to turn the same in such a manner that the tube segment 81 contacts the circular faces 89 of the pawls 86. On the axles 85 pins 90 are fixed over which the ends of compression springs 91 are pushed which springs act between the flaps of the two loading chambers. The deflector sheets 92 (Figs. 17, 19) having slide faces 93 are fixedly connected to the axle 87. The manner of operation of the flaps and pawls is as follows (Figs. 20–23): A rocket 7 sliding over the face 93 into a loading chamber 52 owing to the feeder movement of the control drum 2 forces the pawls 86 with the flaps 80 downward against the thrust of the springs 91 and out of the duct 94 towards the loading chamber. As soon as the rocket is in the loading chamber, the flap 80 jumps upward, the tube segment 81 turning about the axle 85 and contacting the rocket, thereby closing the loading chamber 52 (Fig. 22, 23). At the same time the rocket is ignited in the usual manner by its contact points contacting the contact pins mounted on the tube segment and being in conductive connection to the source of igniting current. When the loading chamber is closed (Fig. 23) the axes of rotation 87 of the pawls 86 and 85 of the flap as well as the centre of the tube segment 81 are in alignment with one another, so that in spite of the thrust of the combustion gases on the tube segment no torque is applied to the same or to the pawls.

A third embodiment of the closure member for the loading chambers is illustrated in the Figs. 24 and 25. In contrast to the first embodiment illustrated in the Figs. 3 and 9, for each of the two loading chambers a separate rocker member 99 is provided which consists of the individual sections **99*a*, 99*b*, 99*c* rotatably mounted on axles 100 which are mounted in the casing 3 and in the ribs 43 of the casing. The individual sections are formed by tube segments 101 having abutment cams 102 and walls 103 fitted at the ends perpendicular to the wall of the tube. On adjacent walls 103 of sections arranged in pairs of the rocker member the ends of compression springs 104 abut bolts 105, which springs tend to turn the two rocker members 99 apart from one another about the axles 100**.

The manner of operation of the rocker members is briefly as follows (Figs. 26–29):

A rocket 7 which is conveyed into a loading chamber 52 turns the rocker member sections **99*a*, 99*b*, 99*c* downward against the bias of the springs 104, by running on the faces 106 of the walls 103 of those sections which protrude into the path of the rocket. When the rocket 7 has reached the firing position, the sections of the rocker members are again turned up by these springs until the cam 102 abuts the casing 3**. During this rotation of the rocker member the rocket is ignited in the manner described hereinabove, and the loading chamber is closed.

While I have herein described and illustrated in the accompanying drawings what may be considered typical and particularly advantageous embodiments of my said invention I wish it to be understood that I do not limit myself to the particular details and dimensions described and illustrated for obvious modifications will occur to a person skilled in the art.

What I claim as my invention and desire to secure by Letters Patent, is:

1. A rocket projector comprising in combination a casing, a magazine mounted on said casing, means for guiding rockets in said magazine and casing, a plurality of parallel loading chambers in said casing, a control drum for each of said chambers, each drum conveying rockets from said magazine towards one of said loading chambers, slide faces mounted in said casing guiding the rockets into said loading chambers, a closure member operated by the rockets entering said loading chambers closing said loading chambers in conjunction with their associated control drum after the termination of the loading operation, a barrel located at the front end of each loading chamber, means for driving said guiding means and said control drums at a constant speed and means for automatically igniting a rocket when in firing position in each loading chamber.

2. A rocket projector comprising in combination a casing, a magazine mounted on said casing, means for guiding rockets in said magazine and casing, a plurality of parallel loading chambers in said casing, a control drum for each of said chambers, each drum conveying rockets from said magazine towards one of said loading chambers, slide faces mounted in said casing guiding the rockets into said loading chambers, a rocker member having its axis of rotation between adjacent loading chambers and parallel to the same, the said rocker member under the action of a rocket sliding into one of said loading chambers and swinging towards the other one of said loading chambers forcibly closing the same, a barrel located at the front end of each loading chamber, means for driving said guiding means and said control drums at a constant speed and means for automatically igniting a rocket when in firing position in each loading chamber.

3. A rocket projector comprising in combination a casing, a magazine mounted on said casing, means for guiding rockets in said magazine and casing, a plurality of parallel loading chambers in said casing, a control drum for each of said chambers, each drum conveying rockets from said magazine towards one of said loading chambers, slide faces mounted in said casing guiding the rockets into said loading chambers, flaps mounted parallel to the longitudinal axes of said loading chambers, springs biasing said flaps towards said loading chambers, each of said flaps including a tube segment which under the bias of said springs hugs a rocket contained in said loading chambers and closes the loading chamber thereof, a barrel located at the front end of each loading chamber, means for driving said guiding means and said control drums at a constant speed and means for automatically igniting a rocket when in firing position in each loading chamber.

4. A rocket projector comprising in combination a casing, a magazine mounted on said casing, means for guiding rockets in said magazine and casing, a plurality of parallel loading chambers in said casing, a control drum for each of said chambers, each drum conveying rockets from said magazine towards one of said loading chambers, slide faces mounted in said casing guiding the rockets into said loading chambers, pairs of rocker members mounted coaxially to one another parallel to said loading chambers, each member of a pair being operatively associated with one of said loading members, springs abutting both rocker members of a pair and tending to turn the same towards the closing positions thereof, a barrel located at the front end of each loading chamber, means for driving said guiding means and said control drums at a constant speed and means for automatically igniting a rocket when in firing position in each loading chamber.

References Cited in the file of this patent

UNITED STATES PATENTS

| | | |
|---|---|---|
| 1,328,230 | Johnston | Jan. 13, 1920 |
| 2,317,579 | Bacon | Apr. 27, 1943 |
| 2,630,741 | Robert et al. | Mar. 10, 1953 |

FOREIGN PATENTS

| | | |
|---|---|---|
| 48,651 | France | Feb. 8, 1938 |
| 123,246 | Sweden | Nov. 9, 1945 |